United States Patent
Chong et al.

(10) Patent No.: US 9,706,210 B2
(45) Date of Patent: Jul. 11, 2017

(54) LOW COMPLEXITY CODING BASED ON DYNAMIC MODE DECISION BRANCHING FOR LARGEST CODING UNITS

(71) Applicant: QUALCOMM Incorporated, San Diego, CA (US)

(72) Inventors: In Suk Chong, San Diego, CA (US); Sungwon Lee, San Diego, CA (US); Cheng-Teh Hsieh, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 14/536,216

(22) Filed: Nov. 7, 2014

(65) Prior Publication Data

US 2016/0134876 A1    May 12, 2016

(51) Int. Cl.
| | |
|---|---|
| *H04N 19/176* | (2014.01) |
| *H04N 19/122* | (2014.01) |
| *H04N 19/139* | (2014.01) |
| *H04N 19/105* | (2014.01) |
| *H04N 19/50* | (2014.01) |
| *H04N 19/103* | (2014.01) |
| *H04N 19/137* | (2014.01) |

(52) U.S. Cl.
CPC ......... *H04N 19/176* (2014.11); *H04N 19/103* (2014.11); *H04N 19/105* (2014.11); *H04N 19/122* (2014.11); *H04N 19/137* (2014.11); *H04N 19/139* (2014.11)

(58) Field of Classification Search
CPC .. H04N 19/176; H04N 19/105; H04N 19/122; H04N 19/139; H04N 19/137; H04N 19/103
USPC ...................................... 375/240.02
See application file for complete search history.

(56) References Cited

U.S. PATENT DOCUMENTS

| | | |
|---|---|---|
| 2012/0230411 A1 | 9/2012 | Liu et al. |
| 2013/0003868 A1 | 1/2013 | Sjoberg et al. |
| 2014/0086330 A1 | 3/2014 | Zhou |

OTHER PUBLICATIONS

Yu et al. "Signal & Information Processing Association Annual Summit & Conference Asia-Pacific, Dec. 2012".*
Nightingale J., et al., "Deriving video content type from HEVC bitstream semantics," Proc. SPIE 9139, Real-Time Image and Video Processing, vol. 9139, 2014, pp. 913902-1 to 913902-13.

(Continued)

Primary Examiner — Hee-Yong Kim

(57) ABSTRACT

Provided are techniques for low complexity video coding. For example, a video coder may be configured to calculate a first sum of absolute difference (SAD) value between a CU block and a corresponding block in a reference frame for the largest coding unit (LCU). The video coder may define conditions (e.g., background and/or homogeneous conditions) for the branching based at least in part on the first SAD value. The video coder may also determine the branching based on detecting the background or homogeneous condition, the branching including a first branch corresponding to both a first CU size of the CU block and a second CU size of a sub-block of the CU block. The video coder may then set the first branch to correspond to the first CU size, if the first CU size or the second CU size satisfies the background condition.

28 Claims, 11 Drawing Sheets

(56) References Cited

OTHER PUBLICATIONS

Wang C., et al., "An Effective Transform Unit Size Decision Method for High Efficiency Video Coding," Mathematical Problems in Engineering, Hindawi Publishing Corporation, 2014, vol. 2014, Article ID 718189, 10 pages.
Bu J., et al., "A Predictive Block-Size Mode Selection for Inter Frame in H.264," Proceedings of IEEE International Conference on Toulouse, Acoustics, Speech and Signal Processing, ICASSP 2006, France, May 14-19, 2006, Piscataway, NJ, USA, May 14, 2006 (May 14, 2006), pp. II, XP031386530, DOI: 10.1109/ICASSP.2006.1660493, ISBN: 978-1-4244-0469-8, pp. 917-919.
International Search Report and Written Opinion—PCT/US2015/056035—ISA/EPO—Dec. 18, 2015.
Su J., et al., "Residue Role Assignment based Transform Partition Predetermination on HEVC", 2013 IEEE International Conference on Image Processing, IEEE, Sep. 15, 2013 (Sep. 15, 2013), pp. 2019-2023, XP032565452, DOI: 10.1109/ICIP.2013.6738416.

\* cited by examiner

LOW COMPLEXITY CODING BASED ON DYNAMIC MODE DECISION BRANCHING FOR LARGEST CODING UNITS

TECHNICAL FIELD

This disclosure generally relates to video coding, and more particularly to techniques for low complexity encoding using dynamic mode decision (DMD) branching for multiple largest coding units (LCUs).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video coding standards (e.g., HEVC/H.265, H.264, H.263) utilize block-based processing at the video encoder, wherein prediction blocks (i.e., from inter or intra prediction paths) are subtracted from original pixels, and wherein residuals are transformed into coefficients using a forward transform (e.g., discrete cosine transform (DCT)), quantized, and entropy-coded (e.g., via CAVLC or CABAC). At the video decoder, the coefficients are entropy-decoded, de-quantized, inverse transformed, and then added back to prediction blocks to form reconstructed pixels.

In HEVC, the video encoder includes high complexity modules for mode decision and motion estimation, due in part to the video encoder checking all different coding unit (CU) sizes (i.e., 64×64, 32×32, 16×16, and 8×8) to identify the optimal coding modes and the CU/prediction unit (PU)/transform unit (TU) structures of each coding tree unit (CTU), which adds substantially to the complexity of the HEVC encoder. In this context, there remains a need for a technique to reduce the complexity of the encoding/decoding process.

SUMMARY

The systems, methods, and devices of this disclosure each have several innovative aspects, no single one of which is solely responsible for the desirable attributes disclosed herein. One aspect of this disclosure provides an apparatus and method for low complexity video coding based on reducing the number of coding unit (CU) sizes checked to identify the optimal coding modes and the CU/prediction unit (PU)/transform unit (TU) structures of each coding tree unit (CTU).

In related aspects, provided is an apparatus that is configured to reduce the complexity of branching of a largest coding unit (LCU). The apparatus may include a memory unit configured to store video data. The apparatus may further include a video coding unit (e.g., a video encoder) operationally coupled to the memory unit.

In further related aspects, the video coding unit may be configured to calculate a first sum of absolute difference (SAD) value between a CU block and a corresponding block in a reference frame for the largest coding unit (LCU) based on the video data. The video coding unit may be configured to define conditions for the branching based at least in part on the first SAD value, the conditions including a background condition and a homogeneous condition. The video coding unit may be configured to determine the branching based on detecting the background or homogeneous condition, the branching including a first branch that corresponds to both a first CU size of the CU block and a second CU size of a sub-block of the CU block. The video coding unit may be configured to set the first branch to correspond to the first CU size, if the first CU size or the second CU size satisfies the background condition.

In yet further related aspects, the video coding unit may be configured to set the first branch to correspond to the first CU size, if the first branch satisfies the homogeneous condition. Otherwise, the video coding unit may be configured to set the first branch to correspond to the second CU size.

In still further related aspects, the branching may include a second branch that corresponds to both the second CU size for the sub-block of the CU block and a third CU size for a sub-sub-block of the CU block. The video coding unit may be configured to set the second branch to correspond to the second CU size, if the second branch satisfies the homogeneous condition. Otherwise, the video coding unit may be configured to set the second branch to correspond to the third CU size.

In further related aspects, methods for performing certain functions of the apparatus are also provided.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The present disclosure describes a technique for low complexity video coding based on dynamic mode decision (DMD) branching for multiple largest coding units (LCUs). The DMD branching may be used to reduce the number of coding unit (CU) sizes checked to identify the optimal coding modes and the CU/prediction unit (PU)/transform unit (TU) structures of each coding tree unit (CTU).

Figure 1A:
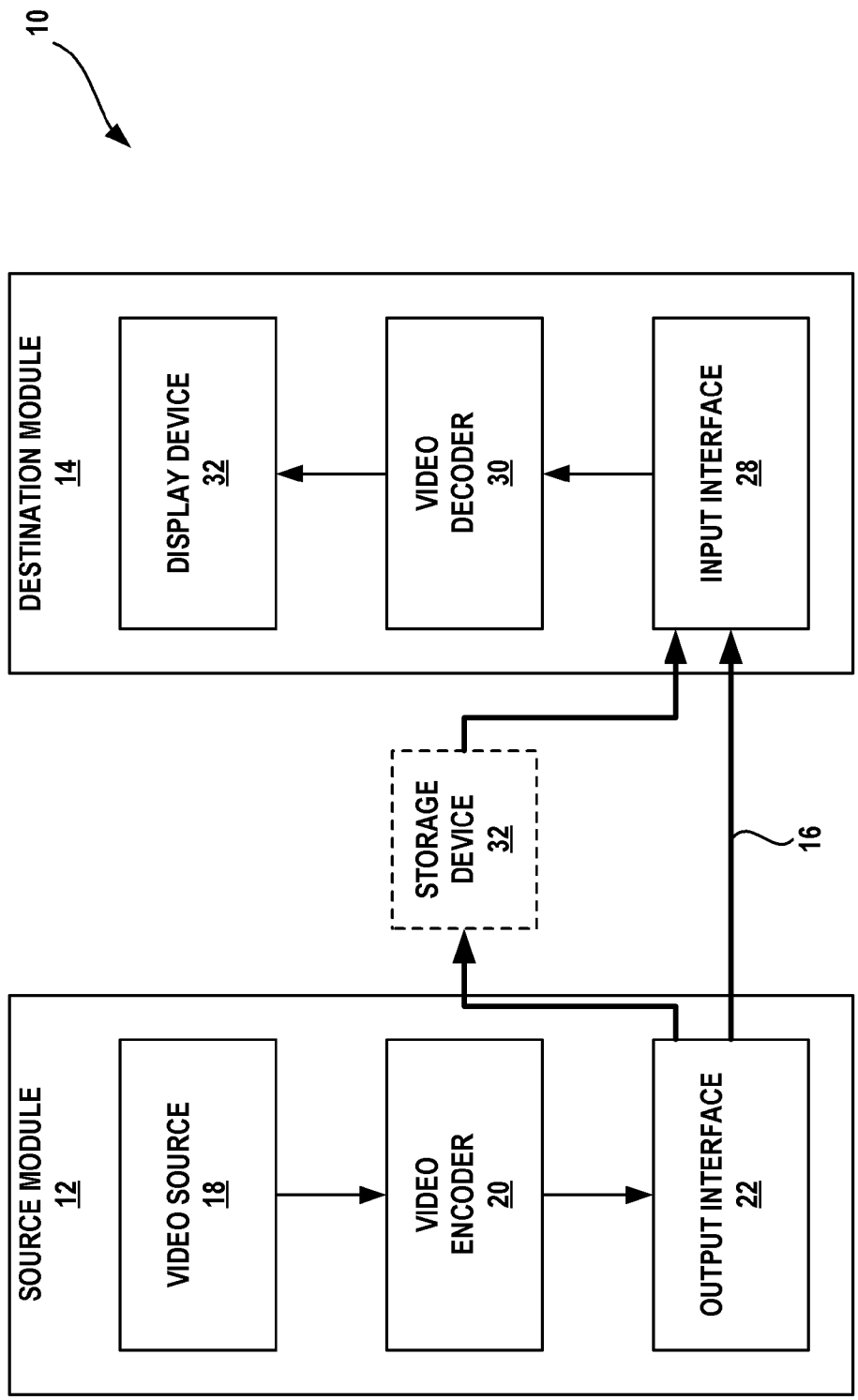
FIG. 1A is a block diagram illustrating an example video encoding and decoding system that may utilize the low complexity video coding techniques described in this disclosure.
Figure 1B:
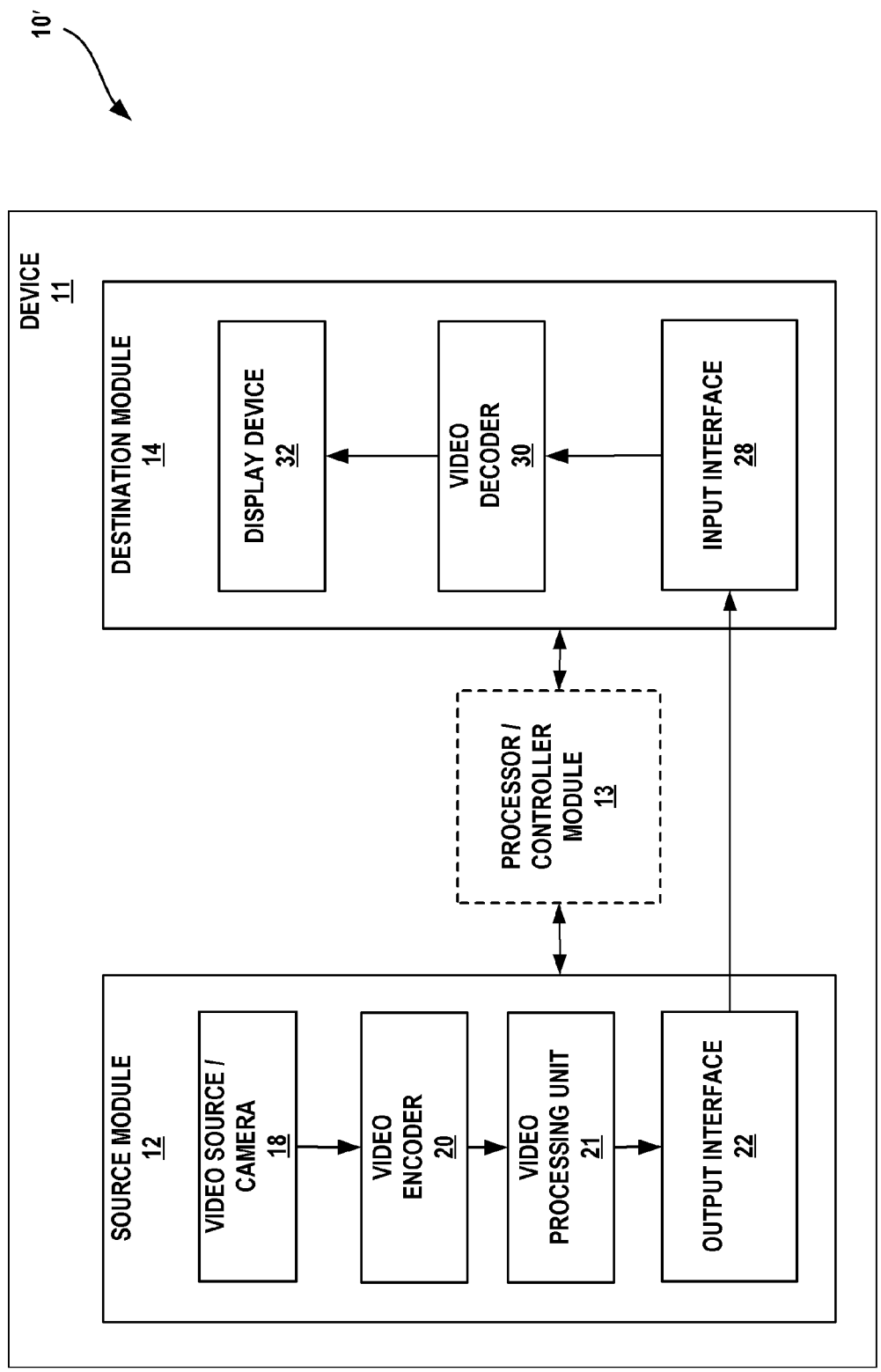
FIG. 1B is a block diagram illustrating another example video encoding and decoding system that may perform the low complexity video coding techniques described in this disclosure.

FIG. 1A is a block diagram illustrating an example video encoding and decoding system 10 that may utilize the low complexity video coding technique described in this disclosure. As shown in FIG. 1A, system 10 includes a source module 12 that generates encoded video data to be decoded at a later time by a destination module 14. In the example of FIG. 1A, the source module 12 and destination module 14 are on separate devices—specifically, the source module 12 is part of the source module, and the destination module 14 is part of a destination device. It is noted, however, that the source and destination modules 12, 14 may be on or part of the same device, as shown in the example of FIG. 1B.

With reference once again, to FIG. 1A, the source module 12 and the destination module 14 may comprise or be included in any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, automobiles/vehicles, wearable gear, etc. In some cases, the source module 12 and the destination module 14 may be equipped for wireless communication.

The destination module 14 may receive the encoded video data to be decoded via a link 16. The link 16 may comprise any type of medium or device capable of moving the encoded video data from the source module 12 to the destination module 14. In the example of FIG. 1A, the link 16 may comprise a communication medium to enable the source module 12 to transmit encoded video data directly to the destination module 14 in real-time. The encoded video data may be modulated according to a communication standard, such as a wireless communication protocol, and transmitted to the destination module 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source module 12 to the destination module 14.

Alternatively, encoded data may be output from an output interface 22 to an optional storage device 31. Similarly, encoded data may be accessed from the storage device 31 by input interface. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source module 12. The destination module 14 may access stored video data from the storage device 31 via streaming or download. The file server may be any type of server capable of storing encoded video data and transmitting that encoded video data to the destination module 14. Example file servers include a web server (e.g., for a website), an FTP server, network attached storage (NAS) devices, or a local disk drive. The destination module 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1A, the source module 12 includes a video source 18, video encoder 20 and an output interface 22. In some cases, the output interface 22 may include a modulator/demodulator (modem) and/or a transmitter. In the source module 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source module 12 and the destination module 14 may form so-called camera phones or video phones, as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted directly to the destination module 14 via the output interface 22 of the source module 12. The encoded video data may also (or alternatively) be stored onto the storage device 31 for later access by the destination module 14 or other devices, for decoding and/or playback.

The destination module 14 includes an input interface 28, a video decoder 30, and a display device 32. In some cases, the input interface 28 may include a receiver and/or a modem. The input interface 28 of the destination module 14 may receive the encoded video data over the link 16. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server.

The display device 32 may be integrated with, or external to, the destination module 14. In some examples, the destination module 14 may include an integrated display device and also be configured to interface with an external display device. In other examples, the destination module 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination modules 12, 14 are on or part of a device or user device 11. The device 11 may be a telephone handset, such as a "smart" phone or the like. The device 11 may include an optional controller/processor module 13 in operative communication with the source and destination modules 12, 14. The system 10' of FIG. 1B may further include a video processing unit 21 between the video encoder 20 and the output interface 22. In some implementations, the video processing unit 21 is a separate unit, as illustrated in FIG. 1B; however, in other implementations, the video processing unit 21 can be implemented as a portion of the video encoder 20 and/or the processor/controller module 13. The system 10' of FIG. 1B, and components thereof, are otherwise similar to the system 10 of FIG. 1A, and components thereof.

As described in greater detail below, aspects of this disclosure generally relate to low complexity video coding based on DMD branching for multiple LCUs. The techniques of this disclosure may be performed by component(s) of the video encoder 20 and optionally the video decoder 30.

In one example, the video encoder 20 and the video decoder 30 may operate according to video compression standards, including HEVC or the like. In another example, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. Other examples of video compression standards include MPEG-2 and ITU-T H.263. The techniques of this disclosure, however, are not limited to any particular coding standard or technique.

Although not shown in FIGS. 1A-B, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of CTUs, also referred to as LCUs, that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into CUs according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and PUs and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, the addition of offset values to pixels in an LCU or other coding unit may improve coding in some instances. For example, offset values may be applied to pixels of a reconstructed video block in order to compensate for illumination changes, quantization errors, or more generally, to make decoded video data more closely resemble original video data. Sample adaptive offset (SAO) techniques allow for different offset values to be applied to different pixels (or blocks of pixels) depending on the pixel values of a pixel (or block).

Figure 2:
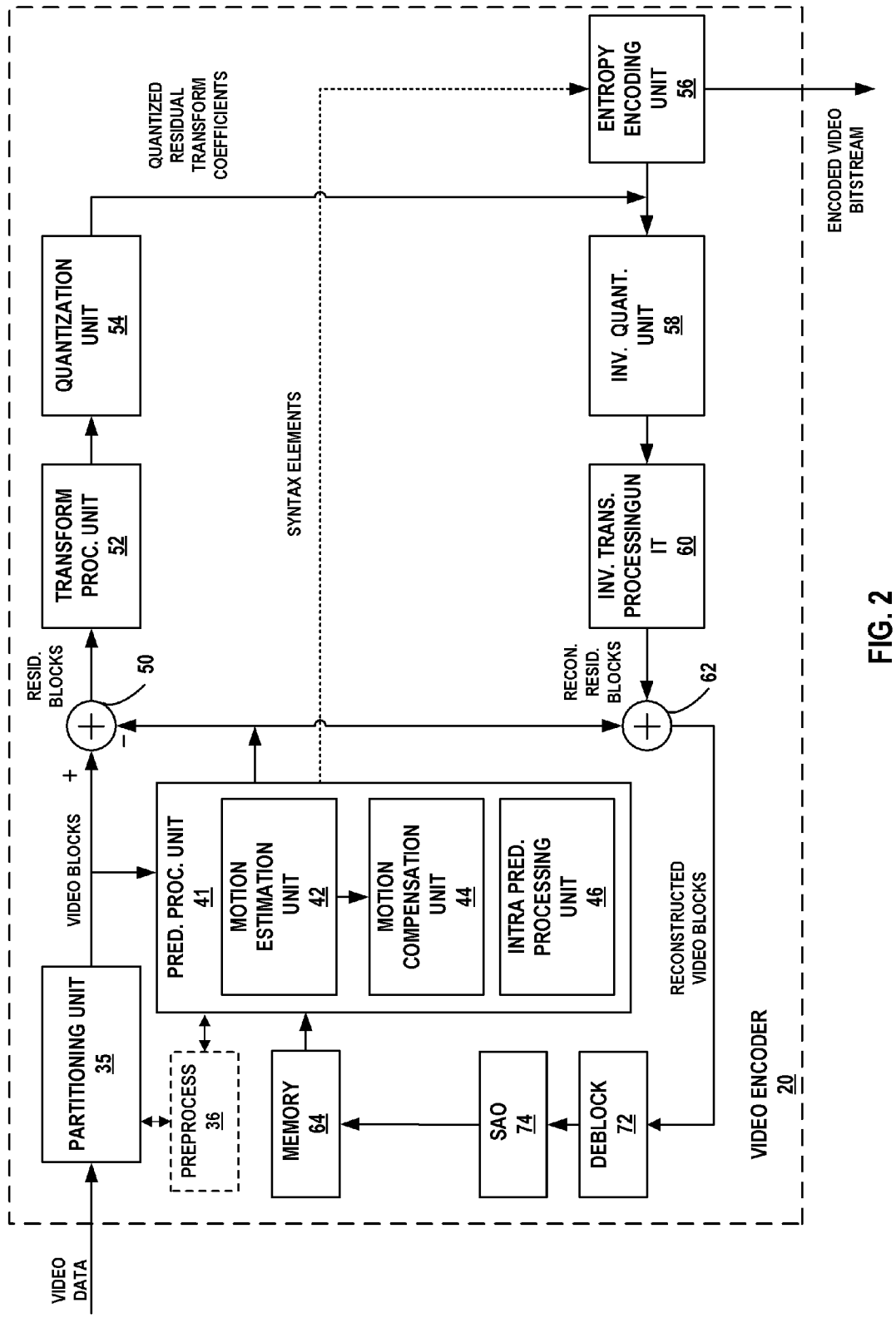
FIG. 2 is a block diagram illustrating an example video encoder that may implement the low complexity video coding techniques described in this disclosure.

FIG. 2 is a block diagram illustrating an example video encoder 20 that may implement the low complexity video coding techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, reference picture memory 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Deblocking filter 72 may also be included to filter block boundaries to remove blockiness artifacts from reconstructed video. As shown in FIG. 2, video encoder 20 also includes additional loop filters, including sample adaptive offset (SAO) filter 74. Although deblocking filter 72 and SAO filter 74 are shown as being in-loop filters in FIG. 2, in some configurations deblocking filter 72 and SAO filter 74 may be implemented as post-loop filters. Additionally, the deblocking filter 72 may be omitted in some implementations.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, which may include a partition size, such as one of a plurality of intra coding modes or one of a plurality of inter coding modes, for the current video block-based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as predicted slices (P slices), bi-direction predicted slices (B slices), or generalized PB slices (GPB slices). Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block-based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may perform intra-prediction on a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and prediction processing unit 41 may select an appropriate intra-prediction or inter-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

After selecting an intra-prediction mode for a block, prediction processing unit 41 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64.

Prior to storage in memory 64, the reconstructed residual block can be filtered by one or more filters. If desired, deblocking filter 72 may also be applied to filter the reconstructed residual blocks in order to remove blockiness artifacts. Other loop filters (either in the coding loop or after the coding loop) may also be used to smooth pixel transitions, or otherwise improve the video quality. One example of such a loop filter is SAO filter 74. The reference block may be used by motion estimation unit 42 and motion compensation unit 44 as a reference block to inter-predict a block in a subsequent video frame or picture.

SAO filter 74 can determine offset values for SAO filtering in a manner that improves video coding quality. Improving video coding quality may, for example, involve determining offset values that make a reconstructed image more closely match an original image. Video encoder 20 may, for example, code the video data using multiple passes with different offset values and choose, for inclusion in an encoded bitstream, the offset values that offer a desirable coding quality, as determined based on a rate-distortion calculation, for example.

In some configurations, SAO filter 74 may be configured to apply one or more types of offset, such as edge offset described above. SAO filter 74 may also at times apply no offset, which can itself be considered a third type of offset. The type of offset applied by SAO filter 74 may be either explicitly or implicitly signaled to a video decoder. When applying edge offset, pixels can be classified based on edge information.

Video encoder 20 of FIG. 2 represents an example of a video encoder configured to determine a first edge index, wherein the first edge index comprises an edge index for a luma component of a first surrounding pixel, determine a second edge index, wherein the second edge index comprises an edge index for a luma component of a second surrounding pixel, determine a third edge index based on the first edge index and the second edge index, wherein the third edge index comprises an edge index for a chroma component of a current pixel, select an offset based on the third edge index, and apply the offset to the chroma component of the current pixel.

Figure 3:
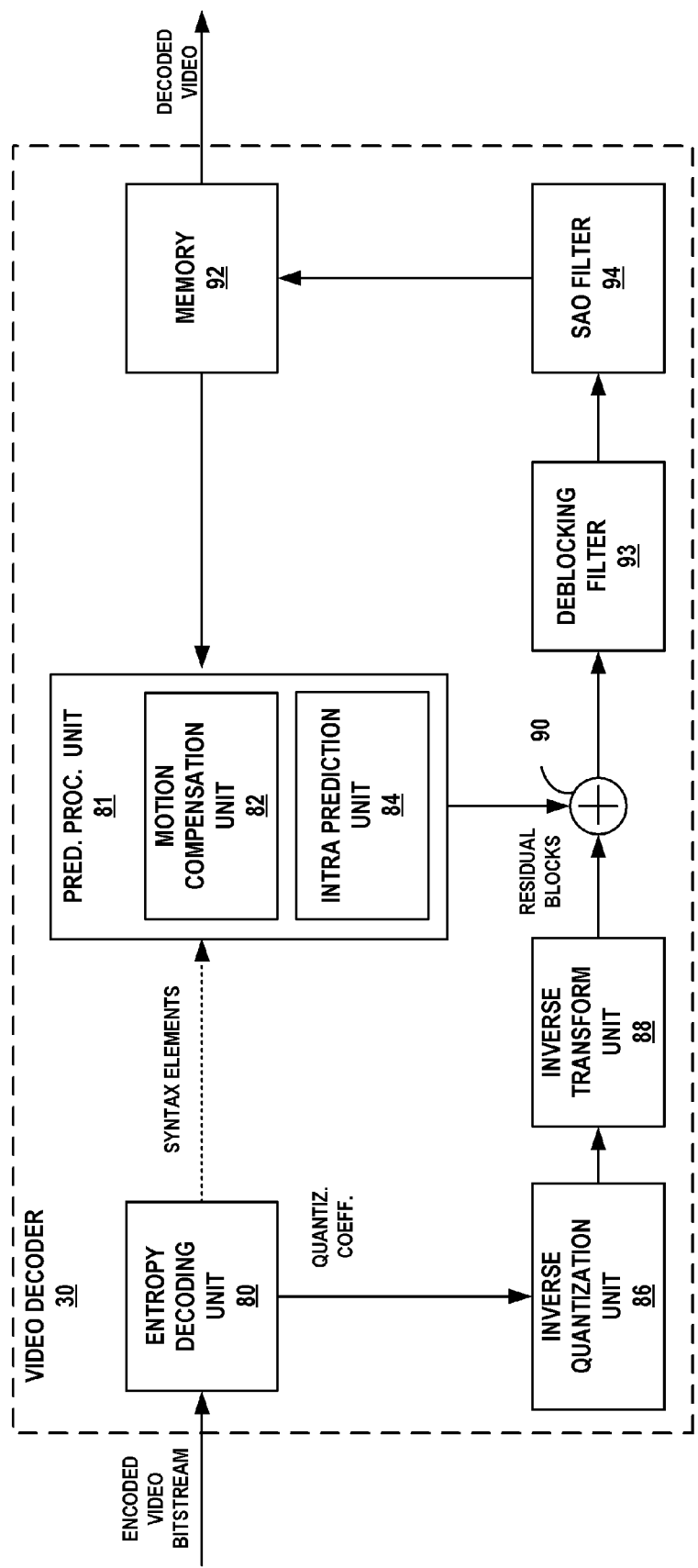
FIG. 3 is a block diagram illustrating an example video decoder that may implement the low complexity video coding techniques described in this disclosure.

FIG. 3 is a block diagram illustrating an example video decoder 30 that may implement the low complexity video coding techniques described in this disclosure. In the example of FIG. 3, video decoder 30 includes an entropy decoding unit 80, prediction processing unit 81, inverse quantization unit 86, inverse transformation unit 88, summer 90, and reference picture memory 92. Prediction processing unit 81 includes motion compensation unit 82, for inter-prediction decoding, and intra prediction processing unit 84, for intra-prediction decoding. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding unit 80 of video decoder 30 may entropy decode the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit 81 generates the predictive block for the current video block-based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. The decoded video blocks formed by summer 90 may then be filtered by a deblocking filter 93, SAO filter 94, or the like. The decoded video blocks in a given frame or picture are then stored in reference picture memory 92, which stores reference pictures used for subsequent motion compensation. Reference picture memory 92 also stores decoded video for later presentation on a display device, such as display device 32 of FIGS. 1A-B. In related aspects, SAO filter 94 can be configured to apply one or more of the same filtering (e.g., edge offset and band offset) as SAO filter 74 discussed above.

Video decoder 30 of FIG. 3 represents an example of a video decoder configured to determine a first edge index, wherein the first edge index comprises an edge index for a luma component of a first surrounding pixel, determine a second edge index, wherein the second edge index comprises an edge index for a luma component of a second surrounding pixel, determine a third edge index based on the first edge index and the second edge index, wherein the third edge index comprises an edge index for a chroma component of a current pixel, select an offset based on the third edge index, and apply the offset to the chroma component of the current pixel.

Figure 4:
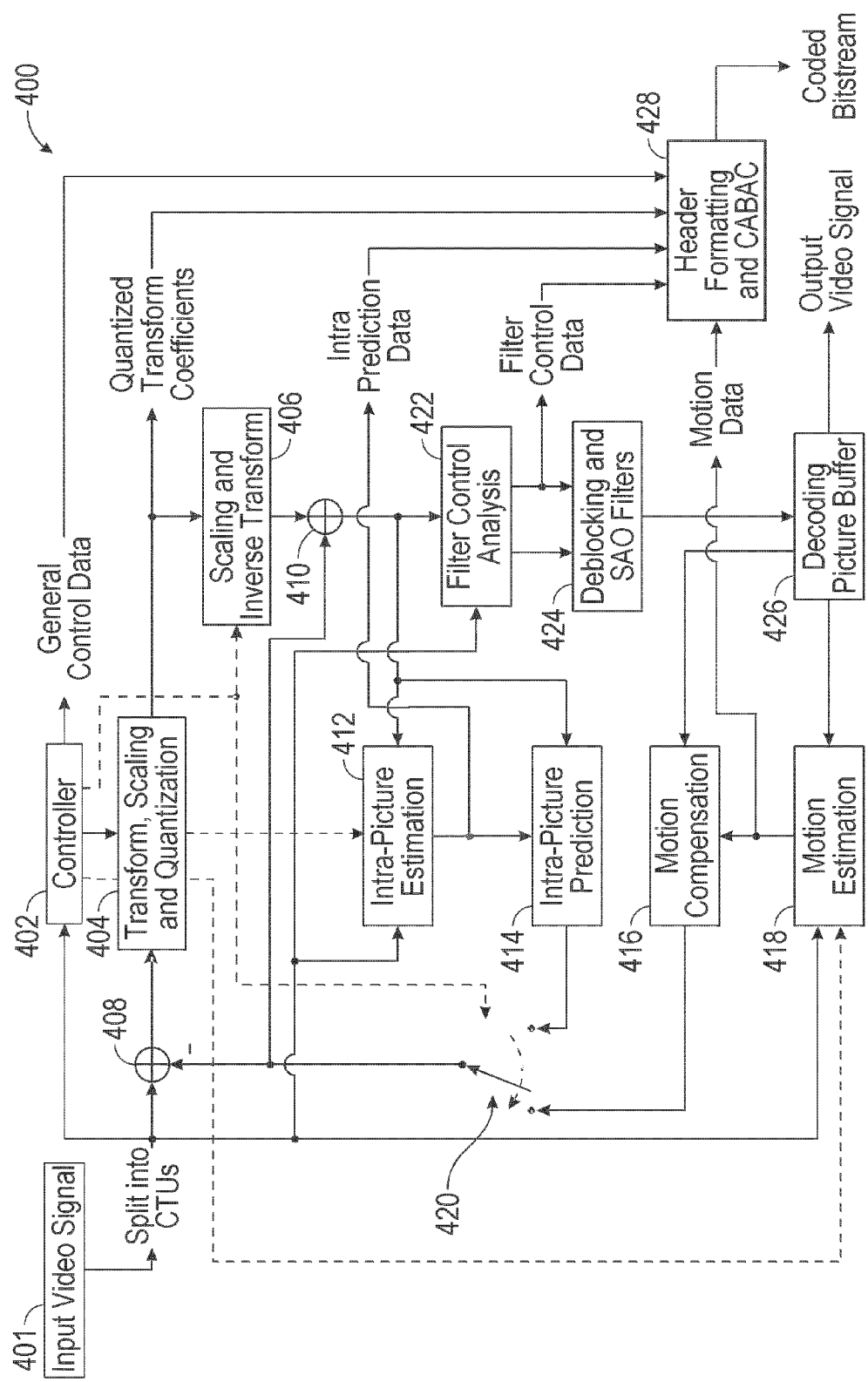
FIG. 4 is a block diagram illustrating an example HEVC video encoder and components thereof.

FIG. 4 provides another representation of a video encoder, such as, for example, an HEVC video encoder and components thereof. It is noted that the video encoder 400 of FIG. 4 is similar to the video encoder 20 of the FIG. 2 in most respects. The video encoder 400 may include, among other things, a general coder controller 402, a transform, scaling and quantization module 404, a scaling and inverse transform module 406, and summers 408 and 410, in operative communication with each other.

The video encoder 400 may further include an intra-picture estimation module 412, and intra-picture prediction module 414, a motion compensation module 416, and a motion estimation module 418, in operative communication with each other and the above-listed components of the video encoder 400. The video encoder 400 may further include a mode decision (intra/inter selection) module 420 in operative communication with the intra-picture prediction module 414 and the motion compensation module 416.

The video encoder 400 may further include a filter control analysis module 422, a deblocking and SAO filter 424, a decoded picture buffer 426, and a header formatting and CABAC module 428, in operative communication with each other and the above-listed components of the video encoder 400.

The input video signal 401 may be split into CTUs. The general control data, the quantized transform coefficients, and intra prediction data, the filter control data, and/or the motion data may be provided to the header formatting and CABAC module 428, which provides the coded bitstream.

As can be seen in the encoders of FIGS. 2 and 4, with video codecs that use block-based processing, prediction blocks (e.g., from inter or intra prediction paths) may be subtracted from the original pixels to generate residuals. The residuals may be transformed into coefficients using forward transform (e.g., DCT), quantized, and entropy coded using various entropy coding engines (e.g., CAVLC or CABAC). In the decoder (e.g., the video decoder 30 in FIG. 3), the coefficients may be entropy decoded, de-quantized, inverse transformed, and then added back to the prediction blocks to form reconstructed pixels.

With reference once again to the example HEVC video encoder 400 in FIG. 4, there are high complexity modules/units, such as, for example, the mode decision module 420 and the motion estimation module 418. For mode decision of the HEVC encoder 400, generally all different CU sizes (i.e., 64×64, 32×32, 16×16, and 8×8) are checked to determine the optimal coding modes and CU/PU/TU structures of each CTU, which accounts for a large, if not largest, portion of the complexity of the HEVC encoder.

To overcome the complexity with existing approaches for block-based video coding, this disclosure describes improvements below. Provided is a video coding technique for low complexity mode decision and motion estimation. Preprocessing of video block information may be used to reduce the complexity of mode decision, for example. In this disclosure, the following described techniques and approaches may be used solely or in any combination.

In accordance with one or more aspects of the present disclosure, there is provided a technique for low complexity video coding, based on DMD branching for a single LCU. The technique may be performed by a system/device, such as, for example, the video encoder 20 of FIGS. 1A-B and 2, the video encoder 400 of FIG. 4, or the like. Similarly, the technique may be performed, adopted, or otherwise taken into account by the video decoder 30 of FIGS. 1A-B and 3, or the like.

For example, the low complexity video coding technique may be performed by the partitioning unit 35, the prediction processing unit 41 and/or an optional preprocessing unit 36, and/or component(s) thereof, of the video encoder 20 in FIG. 2. In related aspects while the preprocessing unit 36 is shown separately from the partitioning unit 35 and the prediction processing unit 41, it is noted that the preprocessing unit 36 may be included/contained within the partitioning unit 35 and/or the prediction processing unit 41. In further related aspects, one or more of the operations for low complexity video coding may be performed by the partitioning unit 35 and/or the prediction processing unit 41. In still further related aspects, the optional preprocessing unit 36 may be subsumed by the partitioning unit 35 and/or the prediction processing unit 41.

In another example, the low complexity video coding technique may be performed by the general coder controller 402, the transform, scaling and/or quantization module 404 of the video encoder 400 in FIG. 4, and/or component(s) thereof.

Preprocessing Information for Low Complexity Mode Decision: In one implementation, the preprocessing information used to the complexity of mode decision may include zero motion sum of absolute difference (SAD) ($SAD_{zero\_2N}$) or simple motion estimation based SAD ($SAD_{sme\_2N}$) for each 2N×2N block (e.g., N can be 4, 8, 16, or 32).

Here, the zero motion SAD (i.e., $SAD_{zero\_2N}$) refers to the SAD between a current CU block and a corresponding block in the reference frame, whereas the simple motion estimation based SAD (i.e., $SAD_{sme\_2N}$) may, for example, be obtained through a subsample based search. Both the $SAD_{zero\_2N}$ and the $SAD_{sme\_2N}$ will be referred as $SAD_{2N}$ in the following disclosure.

Simplification Based on Preprocessing Information: With a typical approach to mode decision and motion estimation, all of the CU sizes are checked (i.e., from 64×64 to 8×8 CU). With the present disclosure, a more efficient mode decision and motion estimation may be achieved by calculating and utilizing preprocessing information (e.g., $SAD_{2N}$) to check only a subset of the CU sizes.

Provided is a technique wherein the video encoder checks only a subset of the CU sizes (e.g., 64×64, 32×32, 16×16, 8×8, 64×64+32×32, 32×32+16×16, or 16×16+8×8), rather than all of the CU sizes, to achieve dynamic mode decision (DMD) branching for one LCU. In other words, the provided technique is for CU size checking based on single LCU (1-LCU) based dynamic branching.

The decision branching is based on preprocessing information, which may, for example, be generated by calculating, for each 2N×2N block (i.e., N can be 4, 8, 16, or 32), a $SAD_{2N}$ value between a current CU block and a corresponding block in a reference frame.

The SAD values may be used to identify branching of the CU sizes based on branching conditions: a background condition (where a current CU is detected to be background of a picture) and/or a homogeneous condition (where a current CU is detected to be homogeneous).

The background condition may be: $SAD_{2N} < Th_{2N}$, where $Th_{2N}$ is a defined threshold, fixed or adaptive.

The homogeneous condition may be: $C_d * SAD_{2N}/4 < SAD_N < C_u * SAD_{2N}/4$, where $C_d$ is less than 1, and $C_u$ is larger than 1, and both $C_d$ and $C_u$ are quantization parameter (QP) dependent thresholds.

In related aspects, the technique may involve using the motion vector (MV) relation between different shapes, in combination with the SAD information. For example, if the MV of 4 N×N blocks are similar to a 2N×2N block, then the 2N×2N block can be considered to be homogeneous, which may result in a preference for the 2N×2N CU shapes over the N×N CU.

Figure 5:
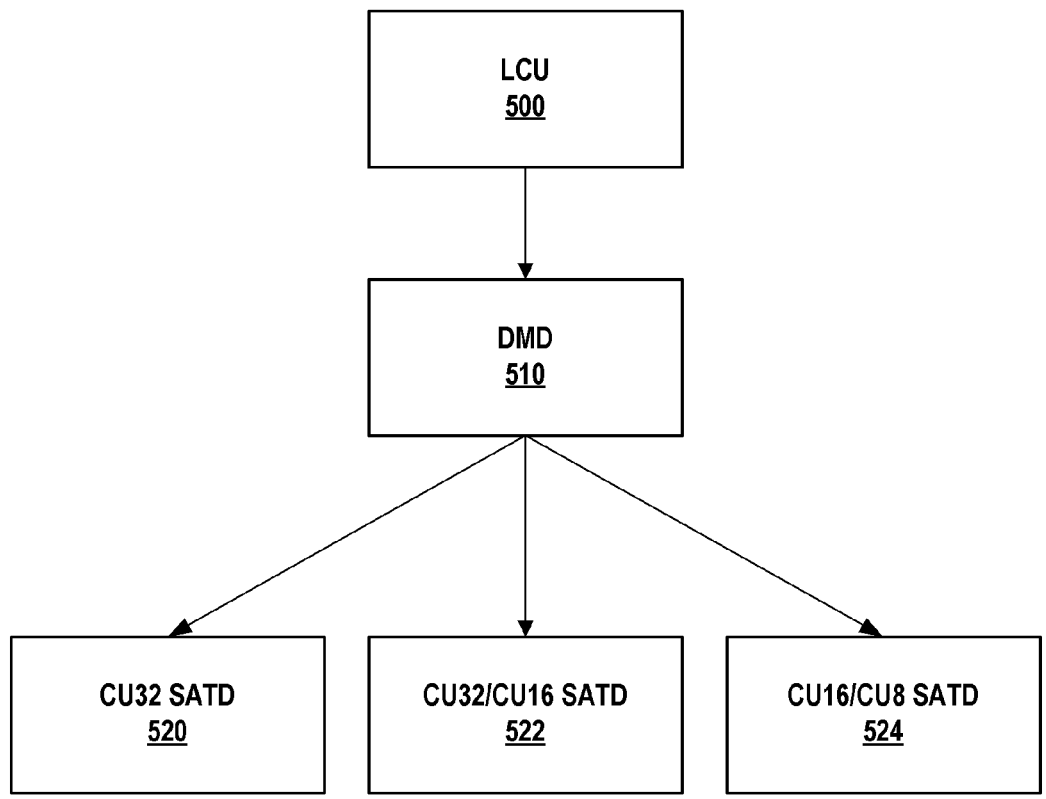
FIG. 5 depicts an illustrative example of a three-branch based approach to DMD branching for an LCU.

Exemplary implementations of DMD branching to achieve low complexity encoding are provided below. With reference to FIG. 5, there is provided an illustrative example of a three-branch based approach to DMD branching 510 for an LCU 500, wherein size of the LCU 500 is 32×32.

In the illustrated example, the three branches may include: a first branch 520 for a 32×32 CU size sum of absolute transformed difference (SATD); a second branch 522 for 32×32 and 16×16 CU size SATD; and a third branch 524 for 16×16 and 8×8 CU size SATD.

In another example, not illustrated, the three branches may include: a first branch 520 for a 32×32 CU size SATD; a second branch 522 for a 16×16 CU size SATD; and a third branch 524 for a 8×8 CU size SATD. It is noted that the branches may be based on other CU sizes and/or combinations thereof.

With continued reference to the example illustrated in FIG. 5, a first condition may be defined for the first branch (i.e., the 32×32 branch). The first condition may include the following: (i) $SAD_{32} < Th_{32}$; or (ii) $C_d * SAD_{32}/4 < SAD_{16}(k) < C_u * SAD_{32}/4$ for k=0, 1, 2, 3.

In other words, the first condition may be met if a SAD value for the 32×32 CU size is less than a threshold background value for the 32×32 CU size, or if a SAD value for the a sub-block of the 32×32 block (e.g., having a CU size of 16×16) is between upper and lower homogeneous threshold values based at least in part on the SAD value for the 32×32 CU size. In related aspects, the upper homogeneous threshold value is $C_u * SAD_{32}/4$ where $C_u$ is greater than 1, whereas the lower homogeneous threshold value is $C_d * SAD_{32}/4$ where $C_d$ is less than 1. In further related aspects, the four k values may correspond to the four 16×16 sub-blocks of the 32×32 LCU 500.

A second condition may be defined for the second branch (i.e., the CU32+CU16 branch). The second condition may include the following: (i) the first condition is not met; and (ii) $SAD_{16}(k) < Th_{16} || C_{d1} * SAD_{32}/4 < SAD_{16}(k) < C_{u1} * SAD_{32}/4$ for k=0, 1, 2, 3, where $C_{d1}$ is smaller than $C_d$ and $C_{u1}$ is bigger than $C_u$.

In other words, the second condition may be met if the first condition is not met, and if a SAD value for the 16×16 CU size is less than a threshold background value for the 16×16 CU size or if the SAD value for the 16×16 CU size is between upper and lower homogeneous threshold values based at least in part on the SAD value for the 32×32 CU size. In related aspects, the upper homogeneous threshold value is $C_u*SAD_{32}/4$, and the lower homogeneous threshold value is $C_d*SAD_{32}/4$.

Additionally, the following condition may be used as part of the second condition for the second branch (i.e., the CU32+CU16 branch): $C_{d2}*SAD_{16}/4 < SAD_8(m) < C_{u2}*SAD_{16}/4$ for m=0, ..., 15.

In other words, this optional, additional condition is met if a SAD value for the 8×8 CU size is between upper and lower homogeneous threshold values based at least in part on the SAD value for the 16×16 CU size. In related aspects, the upper homogeneous threshold value is $C_{u2}*SAD_{16}/4$, and the lower homogeneous threshold value is $C_{d2}*SAD_{16}/4$. In further related aspects, the sixteen m values may correspond to the sixteen 8×8 sub-blocks of the 32×32 LCU 500.

Otherwise (i.e., if the first and second conditions are not met), the third branch (i.e., the CU16+CU8 branch) may be used to identify the best coding modes and the CU/PU/TU structures of each CTU.

Figure 6:
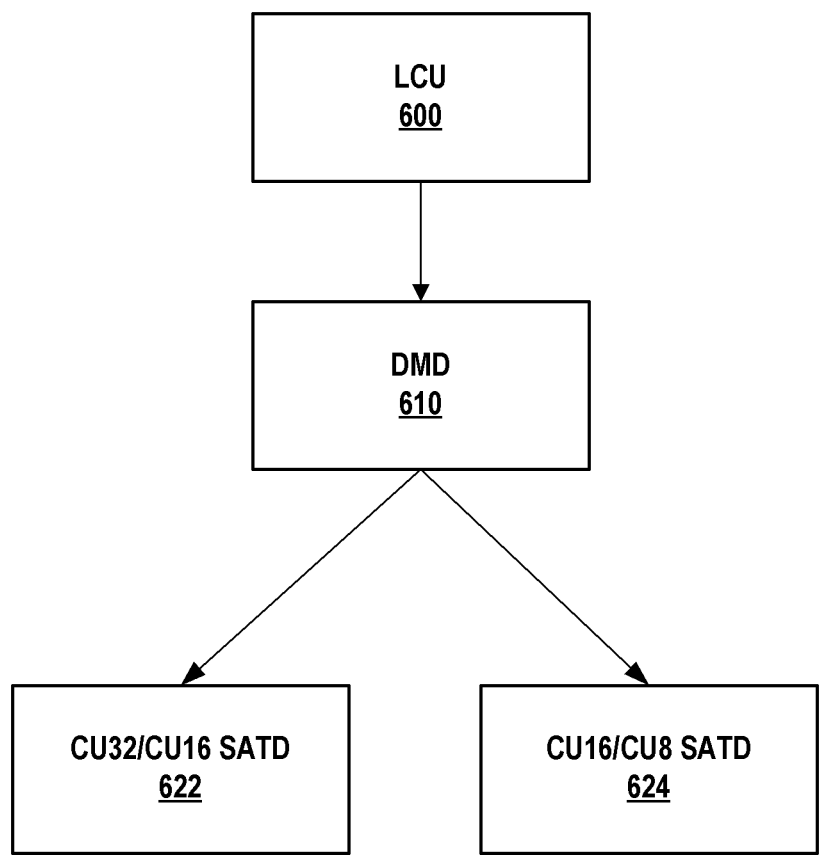
FIG. 6 depicts an illustrative example of a two-branch based approach to DMD branching for an LCU.

With reference to FIG. 6, there is provided an illustrative example of a two-branch based approach to DMD branching 610 for an LCU 600, wherein size of the LCU 600 is 32×32.

In the illustrated example, the two branches may include: a first branch 622 for 32×32 and 16×16 CU size SATD; and a second branch 624 for 16×16 and 8×8 CU size SATD. It is again noted that the branches may be based on other CU sizes and/or combinations thereof.

With continued reference to the example illustrated in FIG. 6, a first condition may be defined for the first branch (i.e., the CU32+CU16 branch). The first condition may include the following: (i) $SAD_{32} < Th_{32}$; or (ii) $C_d*SAD_{32}/4 < SAD_{16}(k) < C_u*SAD_{32}/4$ for k=0, 1, 2, 3.

In other words, the first condition may be met if a SAD value for the 32×32 CU size is less than a threshold background value for the 32×32 CU size, or if a SAD value for the a sub-block of the 32×32 block (e.g., having a CU size of 16×16) is between upper and lower homogeneous threshold values based at least in part on the SAD value for the 32×32 CU size. In related aspects, the upper homogeneous threshold value is $C_u*SAD_{32}/4$ where $C_u$ is greater than 1, whereas the lower homogeneous threshold value is $C_a*SAD_{32}/4$ where $C_d$ is less than 1. In further related aspects, the four k values may correspond to the four 16×16 sub-blocks of the 32×32 LCU 600.

Otherwise (i.e., if the first condition is not met), the second branch (i.e., the CU16+CU8 branch) may be used to identify the best coding modes and the CU/PU/TU structures of each CTU.

It is noted that the threshold background value (e.g., $Th_{32}$ for the 32×32 CU size) may be fixed or adaptive. For fixed threshold background values, one may implement a predefined QP dependent threshold or the like.

For adaptive threshold background values, one may implement a transform processing component (e.g., the transform processing unit 52 of FIG. 2 or the like) that is configured to determine and utilize a distance metric value of the video block and compare that distance metric value with a threshold background value. The distance metric value may provide an indication of the extent to which the video information within the video block changed from the previous frame to the current frame. If the video information did not change at all or changed very little, then the distance metric value may be zero or close to zero. For example, the distance metric value may be or be based on a SAD value, which may indicate a change of pixel information from one frame to the next. In another example, a SAD value of a large CU may be determined by summing the SAD values of the block's individual, smaller CUs (e.g., its 8×8 CUs). In yet another example, the distance metric value may be a sum of squared errors, which may further indicate a change of pixel information from one frame to the next. The distance metric value may also be based on any other indication of a change of pixel information from one frame to the next. For example, the transform processing unit 52 may be further configured to adaptively adjust the threshold background value by comparing the distance metric value of the current block with a previous block.

It is further noted that further complexity reduction may be achieved, in combination with the background determination conditions described-above, for example, by: skipping fractional-pel search; using reference frame 0 only; and/or skipping intra mode, as described in further detail below.

With reference to the example video encoder 20 of FIG. 2, if the transform processing unit 52 determines that the video block is background, then the video encoder 20 may reduce the complexity of its mode decision and motion estimation for that block. For example, the motion estimation unit 42 may be configured to simplify motion estimation for the background block in a number of different ways. For example, the motion estimation unit 42 may search a lesser number of reference frames for the background blocks. To search a lesser number of reference frames, the motion estimation unit 42 may implement one or more of the following methods: (1) search the reference frame 0 only; (2) search a predefined, smaller range (e.g., smaller radius) of frames of the previous frame; (3) use a predictor-only search; (4) conditionally skip searching the half-pels and/or quarter-pels; or (5) any other technique for searching a lesser number of reference frames.

In related aspects, when the motion estimation unit 42 uses a predictor-only search to reduce the complexity of motion estimation for background blocks, the motion estimation unit 42 may stop search refinement after searching the first predictors (e.g., spatial and/or temporal predictors). For foreground blocks, on the other hand, the motion estimation unit 42 may search neighboring block motion vectors, analyze their predictor results for the best match, then further refine its search in this manner until a sufficient result is obtained.

In further related aspects, when the motion estimation unit 42 conditionally skips searching the half-pels and/or quarter pels to reduce the complexity of motion estimation for background blocks, the motion estimation unit 42 may generate motion vector predictors from neighboring blocks in the current frame of the background blocks. Those predictors may then be used in a co-located block from the previous frame. Each predictor may then be applied to find the most appropriate test block and to compare the co-located block to the current frame to determine which is closest. For foreground blocks, on the other hand, the motion estimation unit 42 may first center its focus on the integer pel location, then search a number of (e.g., nine) linearly interpolated half-pel locations, and then further refine its search with a corresponding number of linearly interpolated quarter-pel locations.

As another example of reducing encoding complexity for background blocks, if the transform processing unit 52 determines that the video block is background, then the prediction processing unit 41 and/or a mode select unit (not illustrated) may be configured to simplify mode decision in a number of different ways. For example, the prediction processing unit 41 may skip intra-mode decision going forward. In related aspects, the prediction processing unit 41 may more quickly identify CU size and skip mode decision for smaller blocks within the background block. For example, if a 32×32 block is determined to be background, then the prediction processing unit 41 may instruct the video encoder 20 to skip the mode decision for any blocks within the 32×32 block that are smaller than 32×32. In related aspects, to simplify the mode decision, the prediction processing unit 41 may test a smaller number of merge candidates. Merge candidates may refer to a mode decision process in which various blocks of a previous frame are searched to determine the neighboring blocks' motion vectors. For foreground video blocks, this search and determination may occur, for example, five or more times. For background video blocks, the techniques described herein may facilitate one or two search and determinations.

In accordance with one or more aspects of the present disclosure, there is provided a technique for low complexity video coding, based on DMD branching for multiple LCUs (N LCUs). As with the technique based on DMD branching for a single LCU (described above), the technique based on DMD branching for multiple LCUs may be performed by a system/device, such as, for example, the video encoder 20 of FIGS. 1A-B and 2, the video encoder 400 of FIG. 4, or the like. Similarly, the technique may be performed, adopted, or otherwise taken into account by the video decoder 30 of FIGS. 1A-B and 3, or the like.

Simplification Based on Preprocessing Information: With existing approaches to mode decision and motion estimation, all CU sizes are checked (i.e., from 64×64 to 8×8 CU). With the present technique, simpler mode decision and motion estimation may be applied based on preprocessing information, such that only a subset of the CU sizes are checked.

With N-LCU based dynamic branching, the tradeoff between complexity savings versus video quality loss is considered. The most complex approach may involve performing dynamic programming that considers different options for each LCU of the N LCUs. For each LCU, there may be different operation points for checking a subset of all CU sizes (i.e., 64×64+32×32 or 64×64 or 32×32 . . . ). For each option, the complexity savings and video quality loss may be compared and evaluated. Given a maximum complexity budget for N LCUs, one may find the best combinations of CU checking options for N LCUs which minimizes video quality loss. But such an approach may be too complex or impractical to be applied to a real system.

In related aspects, there is provided a technique that involves first applying a 1-LCU based branching, as described above, using the preprocessing information and then applying additional passes or iterations to further reduce the complexity until the complexity budgets are met. In one example, as explained above with reference to 1-LCU based branching, the branching conditions may be based on the following conditions—i.e., background condition and homogeneous conditions.

The background condition may be: $SAD_{2N} < Th_{2N}$, where $Th_{2N}$ is a defined threshold, fixed or adaptive.

The homogeneous conditions may be: $C_d * SAD_{2N}/4 < SAD_N < C_u * SAD_{2N}/4$, where $C_d$ is smaller than 1, and $C_u$ is bigger than 1, and both $C_d$ and $C_u$ are QP dependent thresholds, i.e., for a non-decreasing function of the QP.

The MV relation between different shapes may be used in combination with the SAD information. For example, if the MV of 4 N×N blocks are similar to a 2N×2N block, then the 2N×2N block can be considered to be homogeneous, which may result in a preference for the 2N×2N CU shapes over the N×N CU.

In one illustrative example, it is assumed that the complexity for each 2N×2N CU size is given as C2N. In one approach, the complexity of all CU sizes may be set to 1. In another approach, the complexity of the CU sizes may vary, such that each of the complexity values in {C64, C32, C16, C8} can be different, e.g., {0.6, 0.8, 1, 1.2}. The complexity of the combinations may be equal to sum of the individual complexities (e.g., the complexity of CU32+CU16 is equal to C32+C16).

In related aspects, N-LCU based approaches may be applied to reduce the complexity until the complexity budgets are met. For illustrative purposes, it is assumed, for example, that the LCU size is 32×32 and that the complexity value of each CU checking is the same, i.e., 1 in the present example. An existing/typical approach to mode decision may involve checking all CU sizes (i.e., CU32+CU16+CU8) so that the total complexity is equal to 3. For illustrative purposes, it is assumed, for example, that the target complexity is 1.5.

Figure 7:
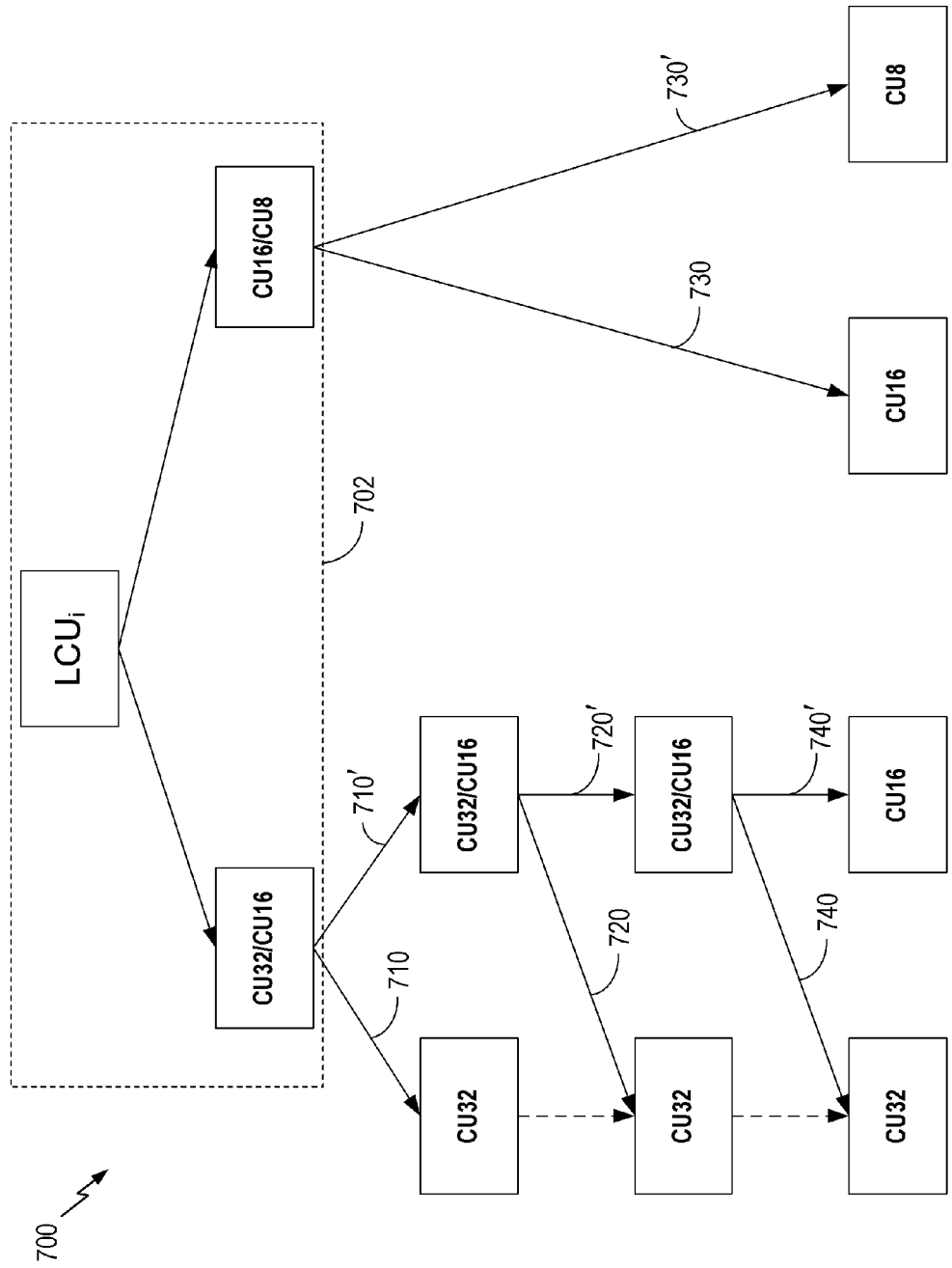
FIG. 7 shows branching of each LCU for the N-LCU based DMD branching.

With reference to FIG. 7, an example technique 700 may involve the following steps:

At step 702, the technique 700 may involve initially applying 1-LCU based branching to each LCU of a group of N LCUs, such as, for example, the two-branch approach described above with reference to FIG. 6.

At step 710, for the CU32+CU16 branch, if all 16×16 are background (i.e., SAD16(k)<Th16 for k=0, 1, 2, 3), then CU32+CU16 may be changed to CU32. Otherwise (i.e., if the background conditions are not met), CU32+CU16 remain as CU32+CU16, at step 710'.

At step 720, for the CU32+CU16 branch, if 32×32 is background (i.e., SAD32<Th32), then CU32+CU16 may be changed to CU32. Otherwise (i.e., if the background conditions are not met), CU32+CU16 remain as CU32+CU16, at step 720'.

At step 730, for the CU16+CU8 branch, if the homogenous conditions are met, then CU16+CU8 may be changed to CU16. Otherwise (i.e., if the homogeneous conditions are not met), CU16+CU8 may be changed to CU8, at step 730'.

At step 740, for the CU32+CU16 branch, if the homogenous conditions are met, then CU32+CU16 may be changed to CU32. Otherwise (i.e., if the homogeneous conditions are not met), CU32+CU16 may be changed to CU16, at step 740'.

In step 702 of the example technique 700 described above, the average complexity of N LCUs changes from 3 to 2. And in the last step (i.e., step 740), the average complexity will become 1. Thus, if the given target complexity is between 1 and 3, the above-described technique 700 or algorithm facilitates achieving the target between step 710 and step 740. When the target complexity is met, one may stop branching. In the example technique 700, one can change the order of steps. Within each step, one may apply branching randomly or based on scores. For example, in step 710, one may use $SAD_{2N}/Th_{2N}$ or $(SAD_{2N}-Th_2)$ as scores, and on the order of small scores, one may apply branching until the complexity budgets are met.

FIG. 7 shows the branching of each LCU for the N-LCU based DMD branching. The multi-step technique 700 described above with reference to FIG. 7 may be further optimized to minimize the memory requirement and/or run-time. Since each step in the algorithm may be independent from each other, during the preprocessing information production stage, one may store the minimum step number at which only one CU size is assigned to each LCU. The minimum step number may be determined, for example, by checking the steps described above for each LCU to detect background and/or homogeneous conditions. Once the minimum step number is assigned to each LCU, at the end of N LCUs one can determine at which pass or iteration to stop the process to meet the complexity budget. With this approach, one does not need to store all of the preprocessing information of N LCUs until all passes are completed. As such, the present technique 700 requires less memory and is less complex.

Number (N) of LCUs in one group: It is noted that N can be, for example, an arbitrary number (e.g., 1, 2, 4, . . . ) or a number of LCUs corresponding to one row of LCUs in a frame (e.g., 128 for 2k×4k or 64 for 1080p resolution). For a larger N, more data can be collected, which may allow for a better tradeoff between quality and timing budgets. At same time, however, the corresponding storage cost and reference search range adjustment may be taken into account for implementations of the system design.

Figure 8:
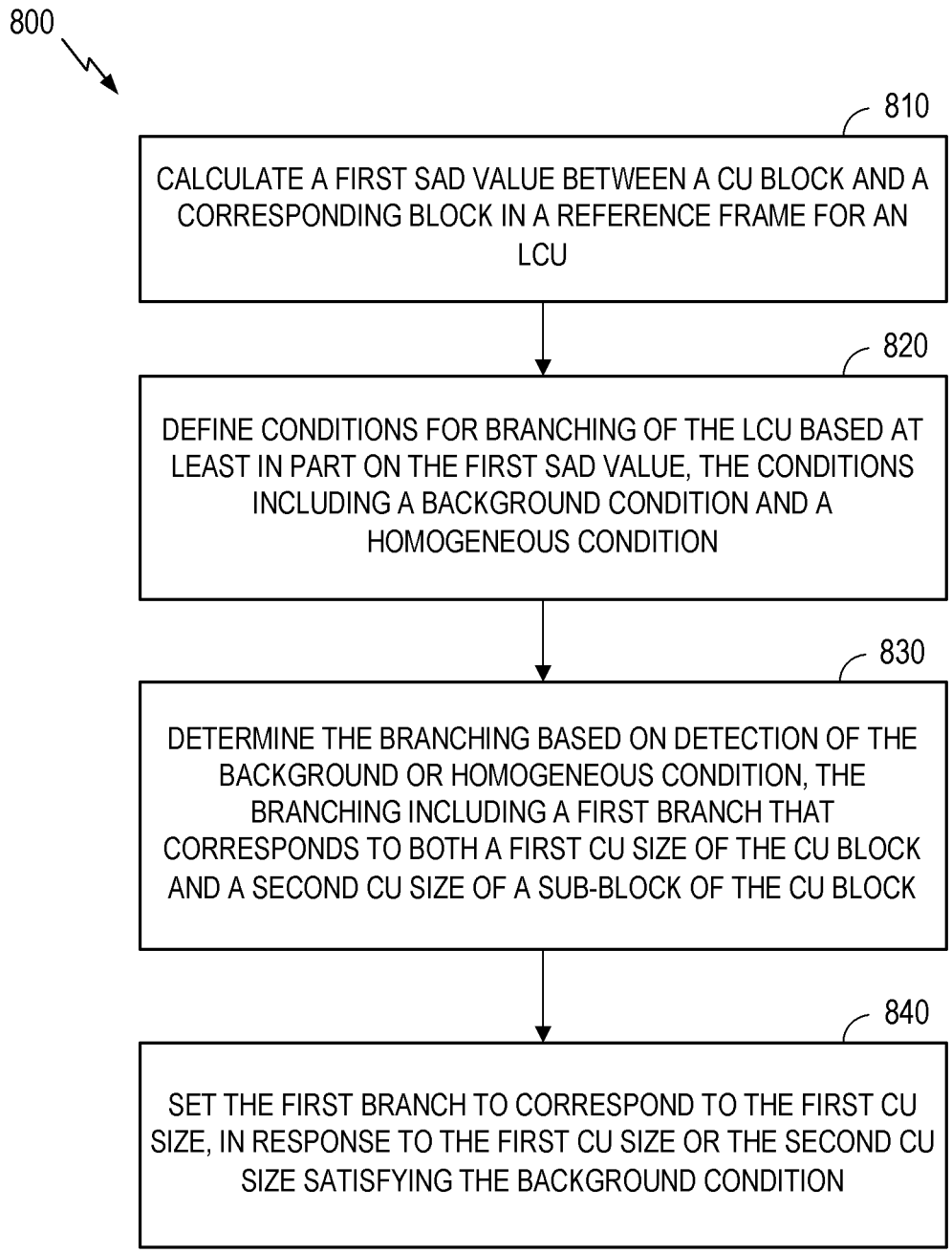
FIG. 8 is a flow chart showing an exemplary technique for low complexity video coding for N-LCUs, in accordance with one or more aspects of this disclosure.

In accordance with one or more aspects of the present disclosure, FIG. 8 is a flow chart illustrating an example method 800 for video coding that involves reducing the complexity of branching of an LCU. One or more of the steps illustrated in FIGS. 8-10 may be performed, for example, by the preprocessing unit 36, the prediction processing unit 41, and/or partitioning unit 35 of FIG. 2, or component(s) thereof. In related aspects, one or more of the steps illustrated in FIGS. 8-10 may be performed, for example, by the prediction processing unit 81 of FIG. 3 or component(s) thereof.

With reference to FIG. 8, the method 800 may involve, at 810, calculating a first SAD value between a CU block and a corresponding block in a reference frame for an LCU. The method 800 may involve, at 820, defining conditions for branching of the LCU based at least in part on the first SAD value, the conditions including a background condition and a homogeneous condition. The method 800 may involve, at 830, determining the branching based on detection of the background or homogeneous condition, the branching including a first branch that corresponds to both a first CU size of the CU block and a second CU size of a sub-block of the CU block. The method 800 may involve, at 840, setting the first branch to correspond to the first CU size, in response to the first CU size or the second CU size satisfying the background condition.

Figure 9:
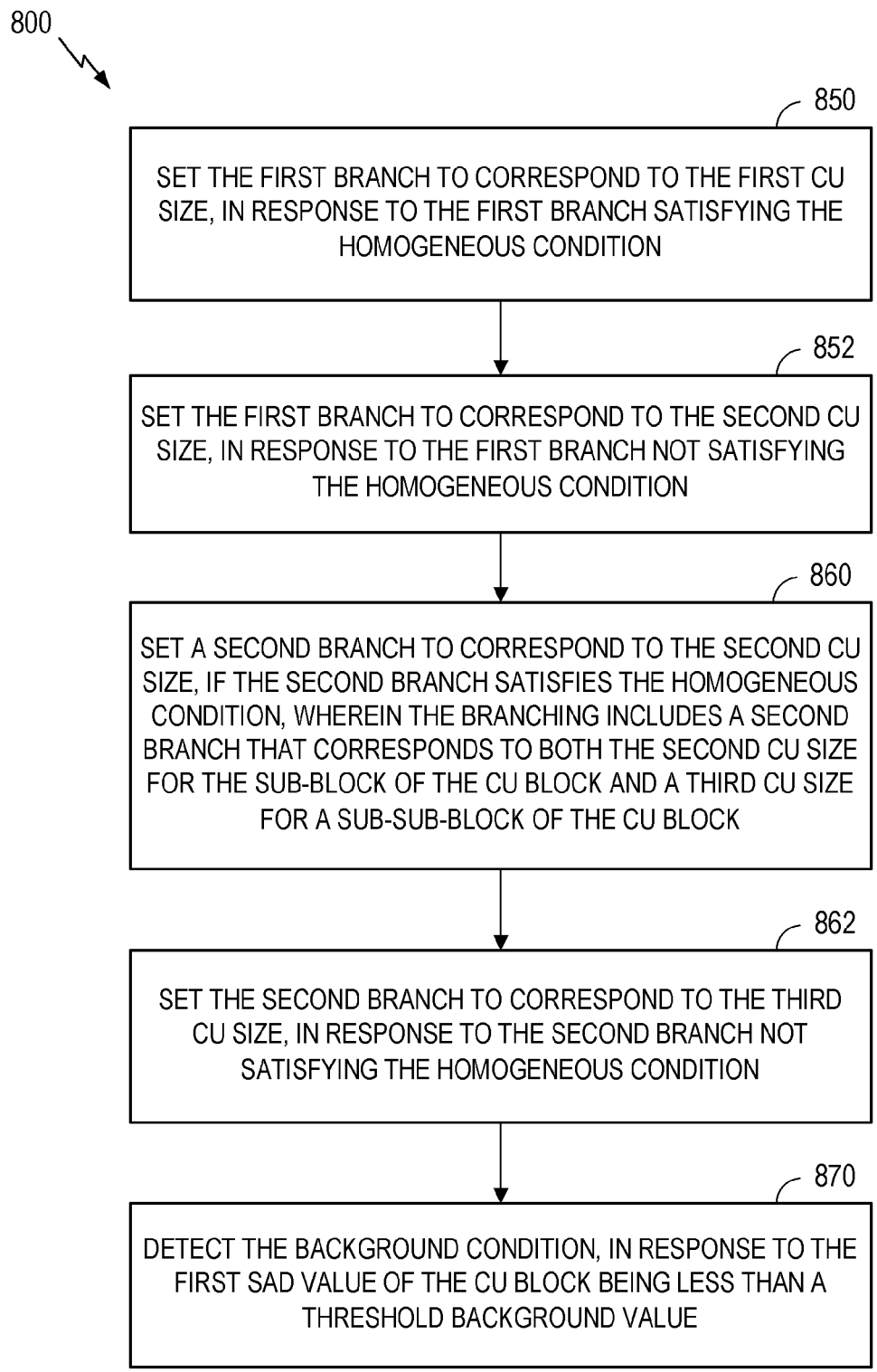
FIGS. 9-10 show further aspects of the method of FIG. 8, in accordance with one or more aspects of this disclosure.
Figure 10:
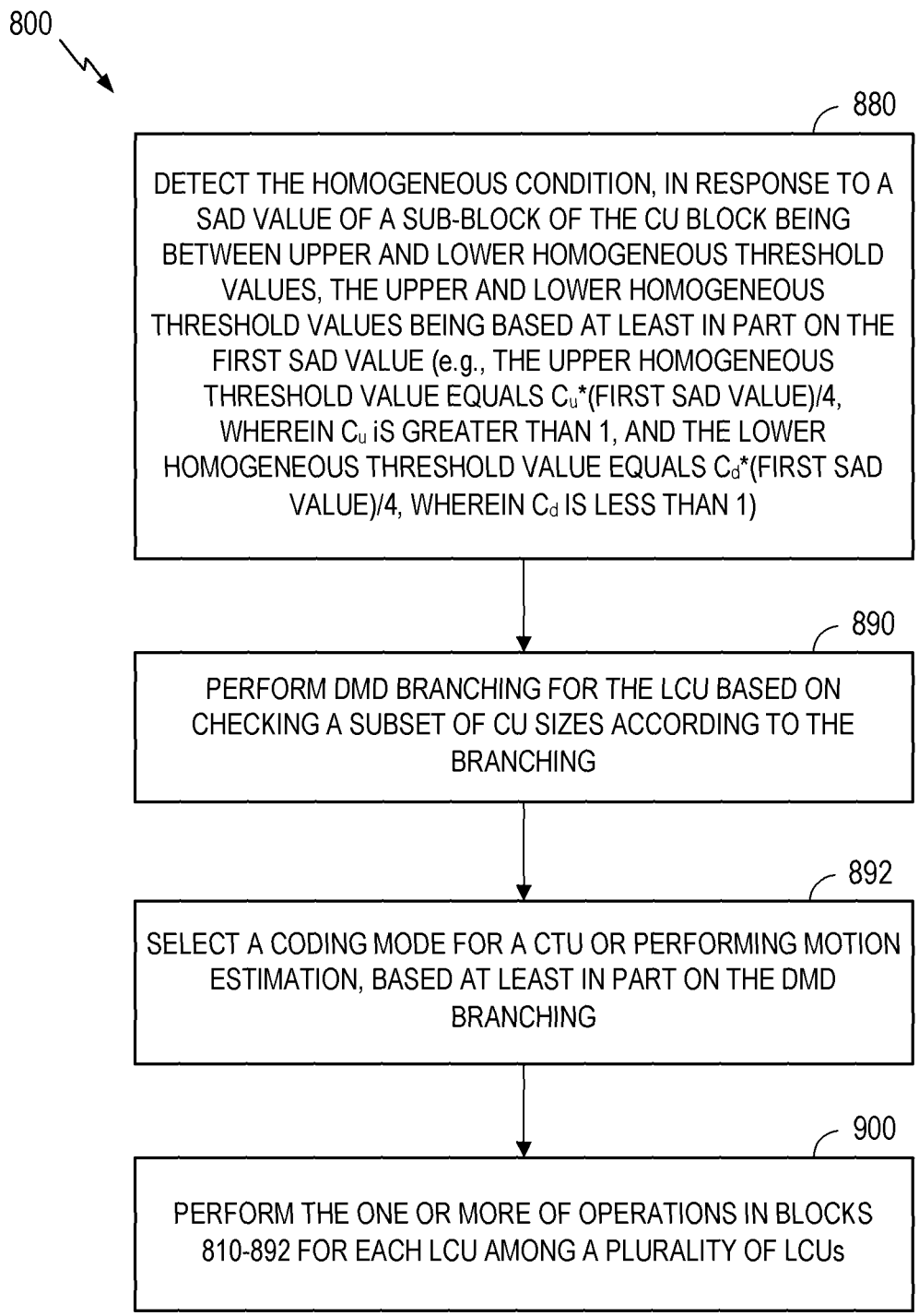

FIGS. 9-10 show further operations or aspects of method 800 that are optional are not required to perform the method 800. If the method 800 includes at least one block of FIGS. 9-10, then the method 800 may terminate after the at least one block, without necessarily having to include any subsequent downstream block(s) that may be illustrated.

With reference to FIG. 9, in related aspects, the method 800 may involve setting the first branch to correspond to the first CU size, in response to the first branch satisfying the homogeneous condition (block 850). The method 800 may further involve setting the first branch to correspond to the second CU size, in response to the first branch not satisfying the homogeneous condition (block 852).

In further related aspects, the branching may include a second branch that corresponds to both the second CU size for the sub-block of the CU block and a third CU size for a sub-sub-block of the CU block. The method 800 may involve setting the second branch to correspond to the second CU size, in response to the second branch satisfying the homogeneous condition (block 860). The method 800 may involve setting the second branch to correspond to the third CU size, in response to the second branch not satisfying the homogeneous condition (block 862).

In yet further related aspects, the method 800 may involve detecting the background condition, in response to the first SAD value of the CU block being less than a threshold background value (block 870).

With reference to FIG. 10, in still further related aspects, the method 800 may involve detecting the homogeneous condition, in response to a SAD value of a sub-block of the CU block being between upper and lower homogeneous threshold values, the upper and lower homogeneous threshold values being based at least in part on the first SAD value (block 880) (e.g., the upper homogeneous threshold value equals $C_u$*(first SAD value)/4, wherein $C_u$ is greater than 1, and the lower homogeneous threshold value equals $C_d$*(first SAD value)/4, wherein $C_d$ is less than 1).

In related aspects, the method 800 may involve performing DMD branching for the LCU based on checking a subset of CU sizes according to the branching (block 890). The method 800 may further involve (i) selecting a coding mode for a CTU or (ii) performing motion estimation, based at least in part on the DMD branching (block 892).

In yet further related aspects, the method 800 may involve performing the one or more of operations in blocks 810-892 for each LCU among a plurality of LCUs (block 900).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. A method for video coding, comprising:
    calculating a first sum of absolute difference (SAD) value between a coding unit (CU) block and a corresponding block in a reference frame for a largest coding unit (LCU);
    calculating one or more second SAD values of one or more sub-blocks of the CU block and corresponding sub-blocks in the reference frame;
    defining conditions for branching of the LCU based at least in part on the first SAD value and one or more second SAD values, the conditions comprising a background condition and a homogeneous condition, wherein a CU block satisfies the background condition in response to the first SAD value of the CU block being less than a threshold background value, and wherein a CU block satisfies the homogenous condition in response to a SAD value of a sub-block of the CU block being between upper and lower homogenous threshold values;
    determining the branching based on detection of the background or homogeneous condition, the branching comprising a first branch that corresponds to both a first CU size of the CU block and a second CU size of a sub-block of the CU block; and
    setting the first branch to correspond to the first CU size, in response to either the first CU size or the second CU size satisfying the background condition.

2. The method of claim 1, further comprising setting the first branch to correspond to the first CU size, in response to either the first CU size or the second CU size satisfying the background condition, or the first branch satisfying the homogeneous condition.

3. The method of claim 2, further comprising setting the first branch to correspond to the second CU size, in response to the first branch not satisfying the homogeneous condition.

4. The method of claim 1, further comprising setting a second branch of the branching to correspond to the second CU size, in response to the second branch satisfying the homogeneous condition, wherein the second branch corresponds to both the second CU size for the sub-block of the CU block and a third CU size for a sub-sub-block of the CU block.

5. The method of claim 4, further comprising setting the second branch to correspond to the third CU size, in response to the second branch not satisfying the homogeneous condition.

6. The method of claim 1, wherein the upper and lower homogeneous threshold values are based at least in part on the first SAD value.

7. The method of claim 6, wherein:
    the upper homogeneous threshold value equals $C_u$*(first SAD value)/4, wherein $C_u$ is greater than 1; and
    the lower homogeneous threshold value equals $C_d$*(first SAD value)/4, wherein $C_d$ is less than 1.

8. The method of claim 1, the method being executable on a wireless communication device, wherein the device comprises:
    a memory configured to store video data;
    a processor configured to execute instructions to process the video data stored in said memory; and
    a transmitter configured to transmit encoded video data using a coding mode based upon the first CU size or the second CU size as determined by the branching.

9. The method of claim 8, wherein the wireless communication device is a wireless telephone and the encoded video data is transmitted by the transmitter and modulated according to a wireless communication standard.

10. An apparatus configured to reduce complexity of branching of a largest coding unit (LCU), comprising:
    a memory unit configured to store video data; and
    a video encoder in communication with the memory unit, the video encoder configured to:
        calculate a first sum of absolute difference (SAD) value between a coding unit (CU) block and a corresponding block in a reference frame for the LCU based on the video data;
        calculate one or more second SAD values of one or more sub-blocks of the CU block and corresponding sub-blocks in the reference frame;
        define conditions for the branching based at least in part on the first SAD value and one or more second SAD values, the conditions comprising a background condition and a homogeneous condition, wherein a CU block satisfies the background condition in response to the first SAD value of the CU block being less than a threshold background value, and wherein a CU block satisfies the homogenous condition in response to a SAD value of a sub-block of the CU block being between upper and lower homogenous threshold values;
        determine the branching based on detecting the background or homogeneous condition, the branching comprising a first branch that corresponds to both a first CU size of the CU block and a second CU size of a sub-block of the CU block; and
        set the first branch to correspond to the first CU size, in response to either the first CU size or the second CU size satisfying the background condition.

11. The apparatus of claim 10, wherein the video encoder is further configured to set the first branch to correspond to the first CU size, in response to either the first CU size or the second CU size satisfying the background condition, or the first branch satisfying the homogeneous condition.

12. The apparatus of claim 11, wherein the video encoder is further configured to set the first branch to correspond to the second CU size, in response to the first branch not satisfying the homogeneous condition.

13. The apparatus of claim 10, wherein the video encoder is further configured to set a second branch of the branching to correspond to the second CU size, in response to the second branch satisfying the homogeneous condition, wherein the second branch corresponds to both the second CU size for the sub-block of the CU block and a third CU size for a sub-sub-block of the CU block.

14. The apparatus of claim 13, wherein the video encoder is further configured to set the second branch to correspond to the third CU size, in response to the second branch not satisfying the homogeneous condition.

15. The apparatus of claim 10, wherein the video encoder is further configured to perform, for each LCU among a plurality of LCUs, (i) calculating the first SAD value, (ii) defining the conditions for the branching, (iii) determining the branching, and (iv) setting the first branch to correspond to the first CU size.

16. The apparatus of claim 10, wherein the homogeneous threshold values are based at least in part on the first SAD value.

17. The apparatus of claim 16, wherein:
the upper homogeneous threshold value equals $C_u$*(first SAD value)/4, wherein $C_u$ is greater than 1; and
the lower homogeneous threshold value equals $C_d$*(first SAD value)/4, wherein $C_d$ is less than 1.

18. The apparatus of claim 10, wherein the video encoder is further configured to perform dynamic mode decision (DMD) branching for the LCU based on checking a subset of CU sizes according to the branching.

19. The apparatus of claim 18, wherein the video encoder is further configured to (i) select a coding mode for a coding tree unit (CTU) or (ii) perform motion estimation, based at least in part on the DMD branching.

20. The apparatus of claim 10, wherein the device is a wireless communication device, further comprising:
a transmitter configured to transmit encoded video data using a coding mode based upon the first CU size or the second CU size as determined by the branching.

21. The apparatus of claim 20, wherein the wireless communication device is a wireless telephone and the encoded video data is transmitted by the transmitter and modulated according to a wireless communication standard.

22. An apparatus for video coding, comprising:
means for calculating a first sum of absolute difference (SAD) value between a coding unit (CU) block and a corresponding block in a reference frame for a largest coding unit (LCU);
means for calculating one or more second SAD values of one or more sub-blocks of the CU block and corresponding sub-blocks in the reference frame;
means for defining conditions for branching of the LCU based at least in part on the first SAD value and one or more second SAD values, the conditions comprising a background condition and a homogeneous condition, wherein a CU block satisfies the background condition in response to the first SAD value of the CU block being less than a threshold background value, and wherein a CU block satisfies the homogenous condition in response to a SAD value of a sub-block of the CU block being between upper and lower homogenous threshold values;
means for determining the branching based on detection of the background or homogeneous condition, the branching comprising a first branch that corresponds to both a first CU size of the CU block and a second CU size of a sub-block of the CU block; and
means for setting the first branch to correspond to the first CU size, in response to either the first CU size or the second CU size satisfying the background condition.

23. The apparatus of claim 22, further comprising means for setting the first branch to correspond to the first CU size, in response to either the first CU size or the second CU size satisfying the background condition, or the first branch satisfying the homogeneous condition.

24. The apparatus of claim 23, further comprising means for setting the first branch to correspond to the second CU size, in response to the first branch not satisfying the homogeneous condition.

25. The apparatus of claim 22, further comprising means for setting a second branch of the branching to correspond to the second CU size, in response to the second branch satisfying the homogeneous condition, wherein the second branch corresponds to both the second CU size for the sub-block of the CU block and a third CU size for a sub-sub-block of the CU block.

26. The apparatus of claim 25, further comprising means for setting the second branch to correspond to the third CU size, in response to the second branch not satisfying the homogeneous condition.

27. The apparatus of claim 22,
wherein the upper and lower homogeneous threshold values are based at least in part on the first SAD value.

28. A non-transitory computer readable medium comprising code that, when executed, causes an apparatus to perform a process comprising:
calculating a first sum of absolute difference (SAD) value between a coding unit (CU) block and a corresponding block in a reference frame for a largest coding unit (LCU);
calculating one or more second SAD values of one or more sub-blocks of the CU block and corresponding sub-blocks in the reference frame;
defining conditions for branching of the LCU based at least in part on the first SAD value and one or more second SAD values, the conditions comprising a background condition and a homogeneous condition, wherein a CU block satisfies the background condition in response to the first SAD value of the CU block being less than a threshold background value, and wherein a CU block satisfies the homogenous condition in response to a SAD value of a sub-block of the CU block being between upper and lower homogenous threshold values;
determining the branching based on detection of the background or homogeneous condition, the branching comprising a first branch that corresponds to both a first CU size of the CU block and a second CU size of a sub-block of the CU block; and
setting the first branch to correspond to the first CU size, in response to either the first CU size or the second CU size satisfying the background condition.

* * * * *